United States Patent [19]

Eilingsfeld et al.

[11] 4,015,062

[45] Mar. 29, 1977

[54] DIOXAZOLONE GROUP-CONTAINING POLYMERS

[75] Inventors: Heinz Eilingsfeld, Frankenthal; Herbert Naarmann, Wattenheim, both of Germany

[73] Assignee: Badische Anilin- & Soda-Fabrik Aktiengesellschaft, Ludwigshafen (Rhine), Germany

[22] Filed: Sept. 29, 1975

[21] Appl. No.: 617,783

[30] Foreign Application Priority Data

Oct. 4, 1974 Germany .......................... 2447370

[52] U.S. Cl. ............................ 526/260; 162/168 N; 204/159.14; 260/240 E; 260/307 A; 260/895; 526/240

[51] Int. Cl.² ........................................ C08F 120/26

[58] Field of Search ............... 260/88.3 R, 88.3 L, 260/80.3, 78.4, 80.72; 526/260

[56] References Cited

UNITED STATES PATENTS

| | | | |
|---|---|---|---|
| 2,522,680 | 9/1950 | Kropa et al. | 260/88.3 L |
| 3,609,161 | 9/1971 | Dowbenko | 260/80.72 |
| 3,692,757 | 9/1972 | Dowbenko | 260/80.72 |

*Primary Examiner*—Harry Wong, Jr.
*Attorney, Agent, or Firm*—Johnston, Keil, Thompson & Shurtleff

[57] ABSTRACT

Polymers in which the side chains contain 1,3,4-dioxazol-2-one groups, and the manufacture of said polymers. The novel polymers have the reactivity of 1,3,4-dioxazol-2-one and may also contain other reactive groups. They may be used for the production of shaped articles, coatings and adhesives.

5 Claims, No Drawings

DIOXAZOLONE GROUP-CONTAINING POLYMERS

This invention relates to novel polymers and to a process for the manufacture thereof.

It is an object of the invention to provide polymers having the reactivity of 1,3,4-dioxazol-2-one and containing other reactive groups if desired.

This object is achieved by polymers containing units of the general formula

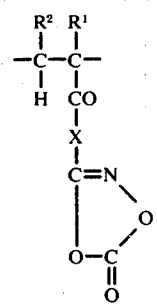

in which $R^1$ denotes hydrogen or alkyl and $R^2$ is hydrogen, a carboxyl group, a carboxylic salt, an ester, amide or a radical of the formula

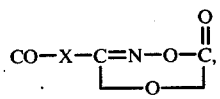

where $X = OCH_2$, $OCH_2-\underset{CH_3}{\overset{CH_3}{\underset{|}{\overset{|}{C}}}}$, $O-\underset{CH_3}{\overset{CH_3}{\underset{|}{\overset{|}{C}}}}$,

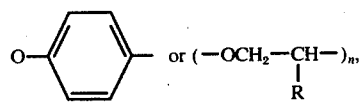

$n$ being an integer of from 1 to 50 and R being hydrogen, alkyl, cycloalkyl or aryl.

Such polymers are polyfunctional macromolecular materials in which the side chains contain 1,3,4-dioxazol-2-one groups and which are accordingly capable of entering into important substitution reactions. The novel polymers have molecular weights of from 1,000 to 3,000,000 and preferably of from 10,000 to 100,000.

It is another object of the invention to manufacture such polymers. This object is achieved by polymerizing unsaturated 1,3,4-dioxazol-2-one compounds of the general formula

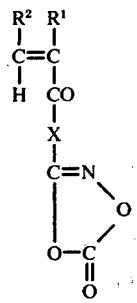

where $R^1$ is hydrogen or alkyl, $R^2$ is H, COOR, COOM, CONHR or

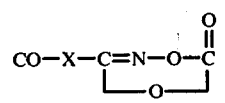

wherein M is a metal cation and R is H, alkyl, cycloalkyl or aryl, and

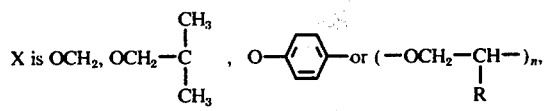

where $n$ is an integer of from 1 to 50, optionally together with other olefinically unsaturated monomers.

Particularly suitable unsaturated dioxazolone derivatives are the compounds I to IV given below:

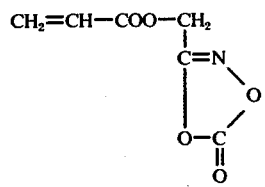  I

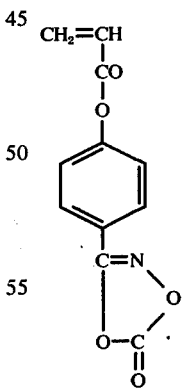  II

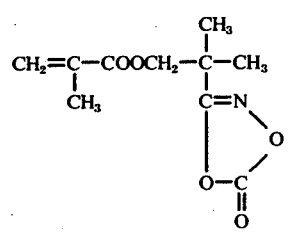  III

-continued

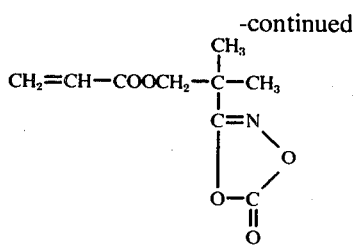

For example, such dioxazolone derivatives may be manufactured by preparing the corresponding hydroxamic acids from the corresponding acid chlorides (e.g. $CH_2=CH-COOCH_2-COCl$) by reaction with hydroxylamine or a salt of hydroxylamine, followed by cyclization of the hydroxamic acid with phosgene.

Suitable olefinically unsaturated comonomers are ethylene, propylene, butadiene and isoprene; styrene and substituted styrene, such as α-methylstyrene, p-chlorostyrene and p-methylstyrene; acrylates and methacrylates of, say, methanol, ethanol, butanol and ethylcyclohexanol; hydroxy and amino derivatives of acrylates such as hydroxypropyl acrylates and dimethylaminoethyl acrylate; acrylamide and methacrylamide and substituted amides such as N-methylolacrylamide, N-methylolmethacrylamide and their ethers; acrylonitrile and methacrylonitrile; vinyl esters such as vinyl acetate and vinyl propionate; vinyl ethers such as methyl and ethyl vinyl ethers; fumaric, maleic and itaconic acids, and the esters and anhydrides thereof. Of these monomeric compounds two or more may be copolymerized with the dioxazolone derivatives at the same time if desired.

The proportion of 1,3,4-dioxazol-2-one derivatives used in preparing the copolymers may vary within wide limits, for example from 1 to 99% and in particular from 5 to 20%, by weight.

The polymerization is initiated either thermally or with usual free-radical initiators. Suitable initiators are, for example, hydrogen peroxide, inorganic peroxides and organic hydroperoxides and peroxides, also compounds which dissociate to free radicals, redox catalyst systems such as the systems consisting of persulfate and ascorbic acid, sodium hydrosulfite or iron (II) salts, and also those chelates of transition metals which are known to be active as free radical agents, particularly those in which the metal is present in a suitable valency, such as chelates of manganese (III), cobalt (III), copper (II) and cerium (IV) with 1,3-dicarbonyl compounds.

The initiators are generally used in an amount of 0.05 to 5%, by weight of the weight of monomers. The optimum portions and the most effective initiator may be readily determined by simple experiment.

The polymerization may be carried out in bulk or in the presence of solvents or diluents. Highly suitable solvents are, for example, alcohols, ketones, ethers, aliphatic, cycloaliphatic and aromatic hydrocarbons, and formamide and dimethylformamide. It is particularly advantageous to use water as diluent.

The suspension, solution or emulsion polymerization processes usual with other monomers may also be used in the above case. Neither does the process of the invention differ from prior art processes as regards any auxiliaries used such as buffer systems, dispersing agents and protective colloids.

Polymerization may be carried out over a wide range of temperatures, for example from about 0° to 150°, and preferably from 50° to 120° C. The process is generally carried out at atmospheric pressure but it is possible to use lower or higher pressures, for example pressures of up to 3000 atmospheres gauge. Particularly, where lowboiling comonomers are used, higher pressures are employed in order to achieve a sufficient concentration of comonomer in the reaction mixture.

Copolymerization of the unsaturated dioxazolone derivatives with ethylene or butadiene is advantageously carried out in emulsion by adding the monomers to be copolymerized to an aqueous soap emulsion containing an initiator, a buffer system and, optionally, a protective colloid and effecting polymerization at elevated pressure. Copolymerization with acrylates is advantageously carried out in aromatic or aliphatic hydrocarbons under the conditions known for polymerization of acrylates.

The polymers of the invention may be used, for example, in the preparation of shaped articles, coatings or adhesives, either alone or in admixture with other plastics materials such as polyethylene, polypropylene and copolymers of ethylene with vinyl acetate. Such products show particularly good dyeability. On account of their surface-active and anti-static properties, the polymers manufactured by the process of the invention are also suitable for finishing papers and textiles. Copolymers of acrylates, which may contain from about 2 to 20% of a dioxazolone derivative and from about 2 to 10% of hydroxyl-containing monomers, such as hydroxypropyl acrylates, by weight, may also be useful as corrosion inhibitors. If, in addition to the dioxazolone side groups, other reactive groups such as OH, $NH_2$ or COOH groups are present in the copolymers, the copolymer may be crosslinked under the influence of light or temperature and is therefore useful as a reactive paint.

In the following Examples the parts and percentages are by weight. The K values are a measure of the average molecular weight and were determined by the method proposed by H. Fikentscher in Cellulosechemie 13 (1932), page 58, on a 1% solution in dimethylformamide.

EXAMPLE 1

100 parts of the dioxazolone compound I are heated for 4 hours at 60° C under a blanket of nitrogen and with stirring with 0.1 part of azodiisobutyronitrile. After precipitation with methanol, washing and drying, there are obtained 90.5 parts of a polymer having a K value of 52.5 and a glass temperature $T_G$ of +38° C. The nitrogen content is 12.3% (theory 12.4%).

EXAMPLES 2 to 12

Ethyl acrylate and the dioxazolone compound II are mixed in specific proportions and heated for 2 hours at 70° C together with 0.1% of azodiisobutyronitrile. The copolymers are precipitated with methanol, washed and dried in a vacuum drying cabinet for 10 hours at 60° C under a pressure of 12 mm of Hg. The properties of the resulting products are listed in the following table:

| Example | Percentage of II in the mixture | Percentage conversion | K value | Percentage of II in copolymer |
| --- | --- | --- | --- | --- |
| 2 | 1 | 96 | 66.5 | 0.4 |
| 3 | 5 | 94.6 | 64.0 | 4.0 |
| 4 | 10 | 96.2 | 63.0 | 10.0 |
| 5 | 20 | 96.6 | 60.0 | 11.0 |
| 6 | 30 | 96.3 | 61.0 | 14.5 |
| 7 | 40 | 99.8 | 59.0 | 23.0 |
| 8 | 50 | 93.5 | 58.0 | 32.0 |
| 9 | 60 | 97.8 | 56.5 | 48.0 |
| 10 | 70 | 100 | 57.0 | 55.5 |
| 11 | 80 | 100 | 55.0 | 73.5 |
| 12 | 90 | 100 | 52.5 | 89.5 |

EXAMPLE 13

30 parts of the dioxazolone compound III are mixed with 2 parts of sodium pyrophosphate, 4.5 parts of potassium persulfate, 2 parts of the sodium salts of a sulfonated fatty alcohol having from 10 to 15 carbon atoms and 1000 parts of water. The mixture is stirred for 8 hours at 90° C while butadiene is pumped into the reaction vessel to give a butadiene pressure of 285 atmospheres gauge. After this reaction time of 8 hours, the dispersion has a solids content of 20% by weight. The K value of the polymer is 54. The proportion of compound III contained in the polymer in combined form is 10.0%.

EXAMPLE 14

Example 13 is repeated except that the dioxazoline compound IV is copolymerized with styrene. After the reaction time of 8 hours at 90° C there is obtained a dispersion having a solids content of 25%. The K value of the copolymer is 52.5 and the proportion of polymerized units of compound IV therein is 17.0% by weight.

EXAMPLE 15

Example 9 is repeated except that the acrylate is replaced by acrylonitrile. There is obtained a conversion of 79%, a K value of 60.5 and a proportion of polymerized units of compound II of 52%.

We claim:
1. A polymer containing units of the formula:

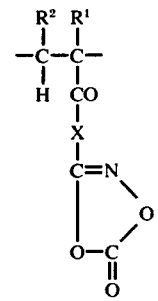

wherein:
$R^1$ is hydrogen or methyl;
$R^2$ is H; and
X is $OCH_2$,

X is $OCH_2$, $OCH_2-\underset{CH_3}{\overset{CH_3}{\underset{|}{\overset{|}{C}}}}$ , $O-\underset{}{\bigcirc}-$ or $(-OCH_2-\underset{R}{\overset{}{\underset{|}{CH}}}-)_n$, where n is an integer of from 1 to 50 and R is hydrogen, alkyl, cycloalkyl or aryl.

2. Polymers as claimed in claim 1, wherein $R^1$ and $R^2$ are both hydrogen and X is $OCH_2$.

3. Polymers as claimed in claim 1, wherein $R^1$ and $R^2$ are both hydrogen and X is

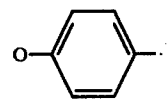

4. Polymers as claimed in claim 1, wherein $R^1$ is $CH_3$, $R^2$ is H and X is

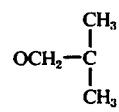

5. Polymers as claimed in claim 1, wherein $R^1$ and $R^2$ are both hydrogen and X is

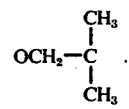

* * * * *